United States Patent
Miyahara et al.

(10) Patent No.: US 8,175,484 B2
(45) Date of Patent: May 8, 2012

(54) IMAGE PROCESSING SYSTEM, IMAGE FORMING APPARATUS, CONTROL METHOD OF THE SAME, PROGRAM, AND STORAGE MEDIUM

(75) Inventors: Nobuaki Miyahara, Yokohama (JP); Hideyuki Makitani, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 12/518,423

(22) PCT Filed: Jun. 23, 2008

(86) PCT No.: PCT/JP2008/061782
§ 371 (c)(1),
(2), (4) Date: Jun. 9, 2009

(87) PCT Pub. No.: WO2009/005020
PCT Pub. Date: Jan. 8, 2009

(65) Prior Publication Data
US 2010/0296827 A1  Nov. 25, 2010

(30) Foreign Application Priority Data
Jun. 29, 2007  (JP) .................................. 2007-172738

(51) Int. Cl.
*G03G 21/02* (2006.01)

(52) U.S. Cl. .......... 399/79; 358/1.14; 705/26.1; 705/31; 705/34

(58) Field of Classification Search .................... 399/79; 358/1.113, 1.14, 1.15; 705/26.1, 30, 34
See application file for complete search history.

(56) References Cited

U.S. PATENT DOCUMENTS

| 6,359,699 | B1 * | 3/2002 | Yoneta et al. | 358/1.16 |
| 6,516,157 | B1 * | 2/2003 | Maruta et al. | 399/8 |
| 7,020,408 | B2 * | 3/2006 | Lester et al. | 399/79 |
| 7,106,463 | B1 | 9/2006 | Makitani | |
| 7,231,418 | B2 * | 6/2007 | Satomi et al. | 709/203 |
| 7,286,782 | B2 * | 10/2007 | Nomura et al. | 399/79 |
| 7,412,183 | B2 * | 8/2008 | Isoda | 399/79 |
| 2003/0090705 | A1 * | 5/2003 | Ferlitsch | 358/1.15 |
| 2005/0117931 | A1 * | 6/2005 | Fukuda | 399/79 |
| 2005/0207776 | A1 * | 9/2005 | Nomura et al. | 399/79 |

FOREIGN PATENT DOCUMENTS

| JP | 2002-132901 | 5/2002 |
| JP | 2003-50692 | 2/2003 |
| JP | 2006-162714 | 6/2006 |
| JP | 2007-49344 | 2/2007 |
| JP | 2007-080209 | 3/2007 |

* cited by examiner

OTHER PUBLICATIONS

Japanese Office Action issued Nov. 11, 2001 in corresponding JP 2007-172738.

*Primary Examiner* — David Gray
*Assistant Examiner* — Francis Gray
(74) *Attorney, Agent, or Firm* — Fitzpatrick, Cella, Harper & Scinto

(57) ABSTRACT

In an image processing system, a charging process for an executed print process is executed using one of a first charging method and a second charging method. Especially, when executing a print process of an image including a plurality of pages, it is determined before the start of the print process of the image including the plurality of pages on the basis of balance information managed in advance whether execution of the print process of the image including the plurality of pages is possible. When the first charging method is selected, execution of the print process is controlled on the basis of the result of determination. When the second charging method is selected, the print process is executed without determination.

16 Claims, 12 Drawing Sheets

FIG. 9

BALANCE CONFIRMATION BEFORE
START OF PRINT PROCESS

⦿ ON ~901

○ OFF ~902

903

OK

IMAGE PROCESSING SYSTEM, IMAGE FORMING APPARATUS, CONTROL METHOD OF THE SAME, PROGRAM, AND STORAGE MEDIUM

This application is a National Stage application under 35 U.S.C. §371 of International Application No. PCT/JP2008/061782, filed on Jun. 23, 2008, which claims priority to Japanese Application No. 2007-172738, filed on Jun. 29, 2007, the contents of each of the foregoing applications being incorporated by reference herein.

TECHNICAL FIELD

The present invention relates to an image processing system for controlling execution of a print process in accordance with a selected charging method, an image forming apparatus, a control method of the same, a program, and a storage medium.

BACKGROUND ART

There is conventionally a system which connects a charging apparatus such as a coin vendor or a card vendor to an image forming apparatus and charges for a print process such as copy or printing. Such a system is used in a store such as a convenience store that provides a print service to many and unspecified users or in a company where the number of used print paper sheets is managed in each department.

More specifically, a user who wants to use, e.g., a copy service pays a charge necessary for a print process in advance by putting coins into a coin vendor or using a prepaid card. The user sets various copy parameters (e.g., number of document sheets, number of copies, paper size, and monochrome/color) and instructs execution of the print process. The print operation starts after confirming that a balance corresponding to the charge for printing based on the set parameters exists. If the balance of the paid amount is short, the print process is not executed.

A user can pay a charge for a print process such as copy or printing by using not only the above-described cash or prepaid card but also a credit card. For example, Japanese Patent Laid-Open No. 2002-132901 describes a print system which allows a user to select a desired one of print charge paying methods such as "credit card" and "automatic withdrawal".

However, the prior art described above has the following problem. When a user pays a print charge using a coin vendor or a prepaid card, the print process is preferably executed within the range of the balance of cash put in advance or the balance represented by information recorded on the prepaid card. Hence, control must be done such that whether the balance necessary for the print process exists is determined first before the start of the print process. If a sufficient balance exists, the print process is executed. If no sufficient balance exists, execution of the print process is inhibited.

When a user pays a print charge using a credit card, it is possible to execute a print process regardless of the balance unless the used amount of the credit card itself reaches the line of credit. More specifically, after the end of all print processes, the credit company is billed the total charge for the print processes. For this reason, it is unnecessary to determine whether a print process can be executed before the start of the print process.

Conventionally, however, execution of a print process is not controlled in accordance with a charging method, although there are a plurality of charging methods usable for paying a charge for a print process, as described above. For this reason, even if a printing apparatus which allows a user who is going to pay a print charge to select one of a paying method using cash put into a coin vendor and a paying method using a credit card exits, control must be done in the following way. That is, it is always determined before the start of a print process whether execution of the print process is possible, or it is not determined at all before the start of the print process whether execution of a print process is possible.

This problem is especially serious in a system formed by connecting a charging apparatus to an image forming apparatus. More specifically, in a system formed by connecting a charging apparatus to an image forming apparatus, it is not easy for the image forming apparatus side to determine the charging method selected on the charging apparatus side. Assume that use of a credit card is selected as the print charge paying method, and the image forming apparatus still inquires of the charging apparatus about whether execution of a print process is possible before the start of the print process. This decreases the print process efficiency.

The present invention has been made in consideration of the above problem, and has as its object to provide an image processing system for controlling execution of a print process in accordance with a selected charging method, an image forming apparatus, a control method of the same, a program, and a storage medium.

DISCLOSURE OF INVENTION

The present invention provides an image processing system, an image forming apparatus, a control method of the same, a program, and a storage medium, which overcome the above-described problem.

According to the present invention, the foregoing object is attained by providing an image processing system comprises:

a printing unit configured to print an image;

a charging unit configured to execute, using one of a first charging method and a second charging method, charging for a print process executed by the printing unit;

a managing unit configured to manage balance information representing a balance usable for charging of the charging unit;

a first determining unit configured to, when the printing unit is going to execute a print process of an image including a plurality of pages, determine before a start of the print process of the image including the plurality of pages on the basis of the balance information managed by the managing unit whether execution of the print process of the image including the plurality of pages is possible; and a control unit configured to control execution of the print process on the basis of a result of determination by the first determining unit when the first charging method is selected, and cause the printing unit to execute the print process without determination by the first determining unit when the second charging method is selected.

Further features of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 9 is a view showing a setting window displayed on an operating unit 120 according to the embodiment of the present invention;

BEST MODE FOR CARRYING OUT THE INVENTION

The embodiments of the present invention will now be described.

First Embodiment

Figure 1:
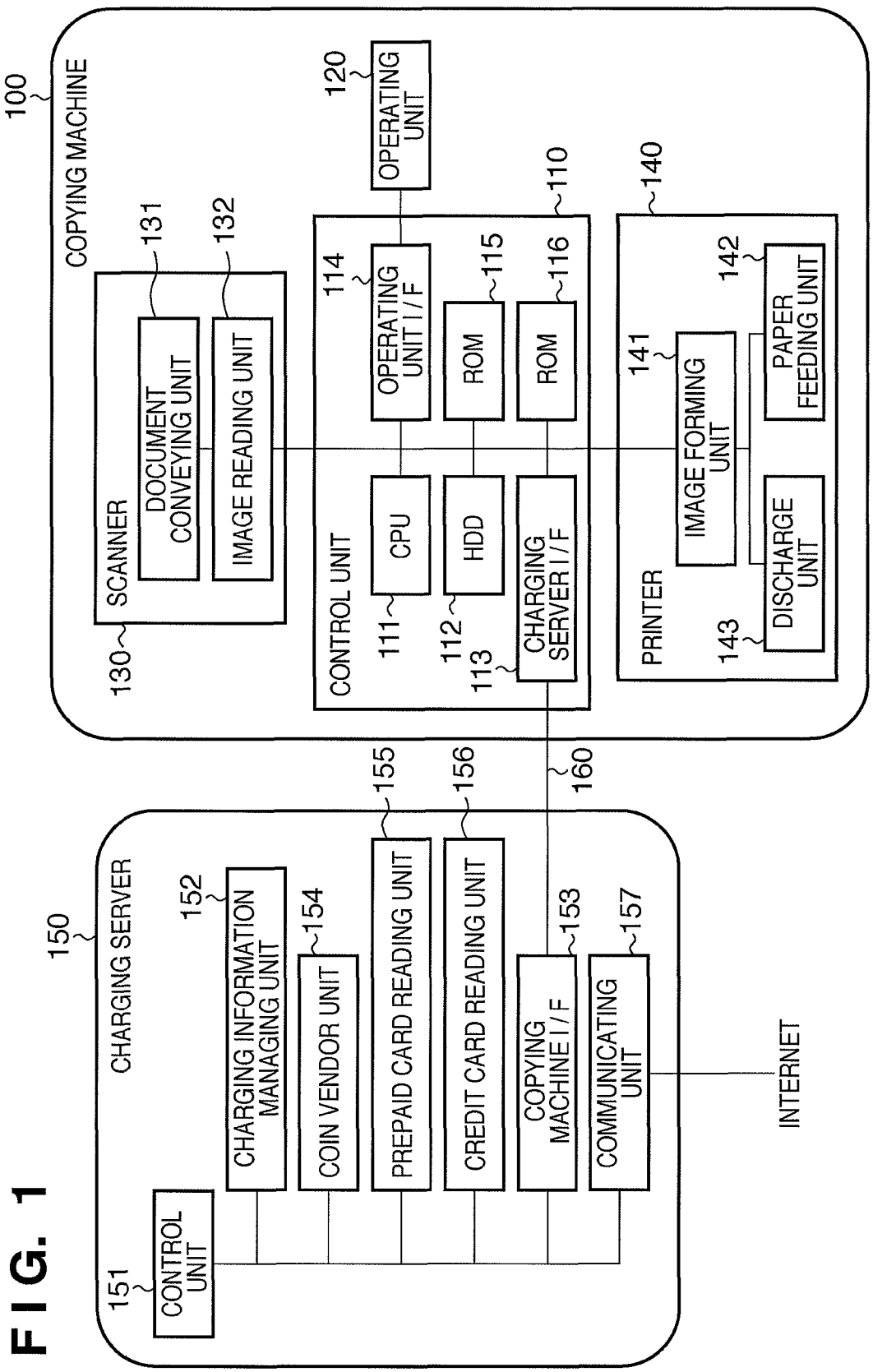
FIG. 1 is a block diagram showing the overall arrangement of an image processing system according to an embodiment of the present invention.

FIG. 1 is a block diagram showing the overall arrangement of an image processing system according to the first embodiment. In the first embodiment, a copying machine 100 as an example of an image processing system of the present invention is connected to a charging server 150 as an example of a charging apparatus of the present invention via an interface 160. The interface 160 can take any form such as a USB (Universal Serial Bus) or an IP network regardless of a parallel port and a serial port.

A scanner 130 includes a document conveying unit 131 and an image reading unit 132. The image reading unit 132 optically reads an image on a document conveyed by the document conveying unit 131, converts the image into image data, and outputs it.

A printer 140 includes an image forming unit 141, paper feeding unit 142, and discharge unit 143. The paper feeding unit 142 capable of loading a plurality of kinds of print paper sheets conveys a print paper sheet. The image forming unit 141 transfers and fixes image data onto the print paper sheet and prints a visible image. The discharge unit 143 discharges the print paper sheet with the printed image data outside the housing of the copying machine 100.

A control unit 110 is electrically connected to the scanner 130 and the printer 140. The control unit 110 includes a CPU 111, HDD (hard disk drive) 112, charging server I/F (interface) 113, operating unit I/F 114, RAM 115, and ROM 116.

The CPU 111 activates the system of the copying machine 100 on the basis of a boot program stored in the ROM 116.

The CPU 111 reads out various kinds of control programs from, e.g., the HDD 112 and executes various processes using the RAM 115 as a work area on the system. The HDD 112 also stores image data together with the various control programs.

The operating unit I/F 114 is an interface which connects the control unit 110 to an operating unit 120. The operating unit I/F 114 transfers, to the operating unit 120, image data to be displayed on it or sends, to the CPU 111, an instruction input by a user via the operating unit 120. The operating unit 120 includes a liquid crystal panel unit having a touch panel function of recognizing instructed contents based on the position information of a portion the user has touched on the window.

The charging server I/F 113 controls information transmission/reception between the charging server 150 and the copying machine 100 via the interface 160.

The charging server 150 includes a control unit 151, charging information managing unit 152, copying machine I/F 153, coin vendor unit 154, prepaid card reading unit 155, credit card reading unit 156, and communicating unit 157. The control unit 151 reads out various kinds of control programs stored in a memory (not shown) and executes various processes, thereby controlling the operation of the entire charging server 150.

The charging information managing unit 152 manages balance information which is information representing the balance of cash put in advance by the user or information representing the balance recorded on a prepaid card. That is, the balance information represents an amount payable for an executed print process. The charging information managing unit 152 also manages print charge information set in correspondence with various parameters (e.g., number of document sheets, number of copies, paper size, monochrome/color, and post-process settings) associated with a print process to be executed by the copying machine 100.

The coin vendor unit 154 receives cash put by the user. The prepaid card reading unit 155 reads information representing the balance recorded on a prepaid card inserted by the user.

The credit card reading unit 156 reads information recorded on a credit card inserted by the user. When the user pays a print charge using a credit card, the charging server 150 is connected to the Internet via the communicating unit 157 and communicates with an external terminal, thereby billing the credit company for the print charge. Note that the copying machine I/F 153 may serve as the communicating unit 157.

Figure 2:
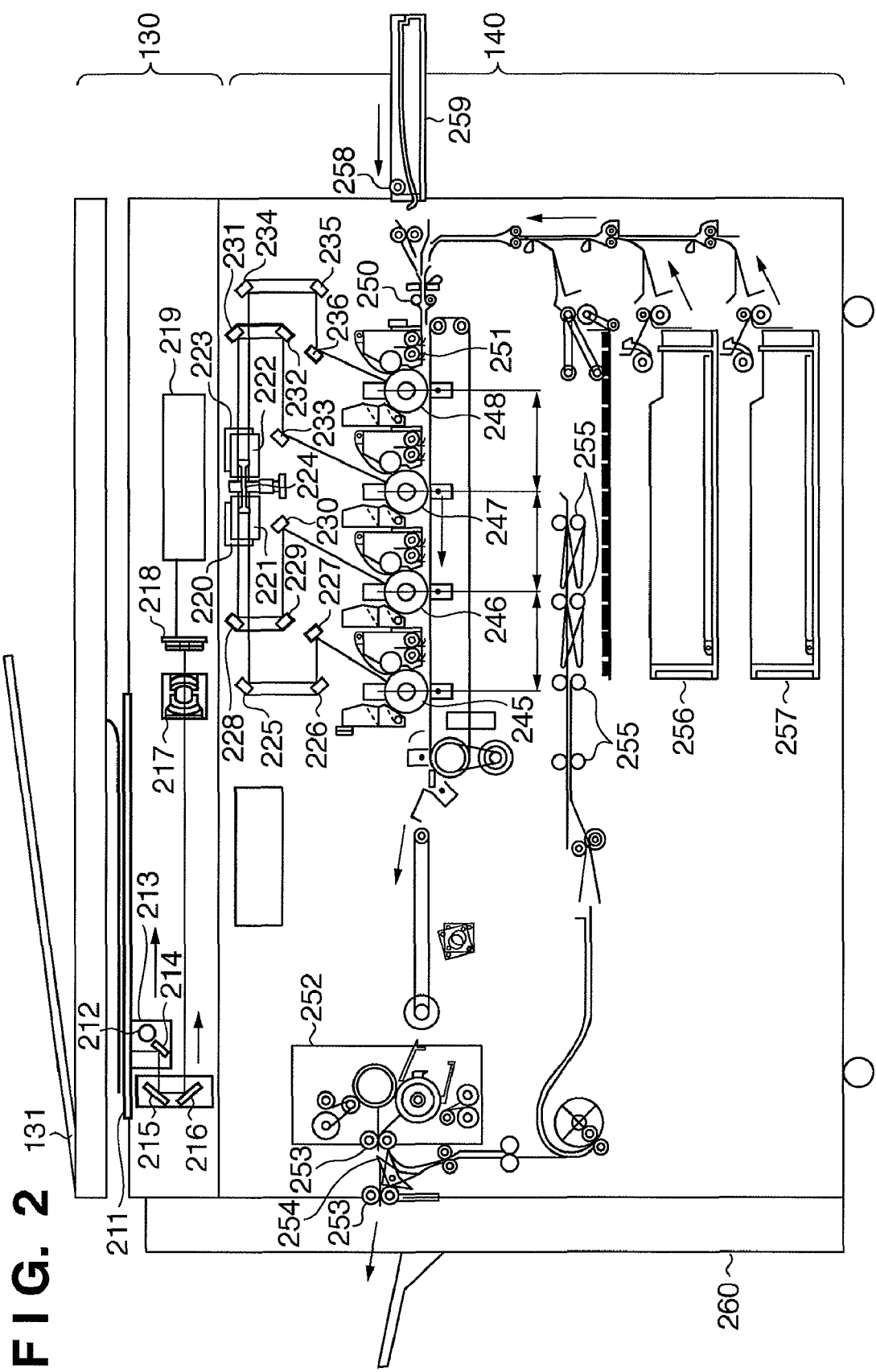
FIG. 2 is a sectional view of a copying machine 100 according to the embodiment of the present invention.

FIG. 2 is a sectional view of the copying machine 100 (scanner 130 and printer 140). The document conveying unit 131 of the scanner 130 conveys document sheets onto a platen glass 211 one by one sequentially from the first page. After the document reading operation is ended, the document sheet on the platen glass 211 is discharged. When a document sheet is conveyed onto the platen glass 211, a lamp 212 turns on, and an optical unit 213 moves to expose and scan the document sheet. Light reflected by the document sheet is guided to a CCD image sensor 218 via mirrors 214, 215, and 216 and a lens 217.

Image data output from the CCD image sensor 218 is transferred to the control unit 110. An image processing unit 219 processes the image data output from the CCD image sensor 218 and outputs it as a print signal.

A laser driver 224 of the printer 140 drives laser light-emitting units 220, 221, 222, and 223 and causes them to emit laser beams based on the image data output from the control unit 110. The laser beams irradiate photosensitive drums 245, 246, 247, and 248 via mirrors 225 to 236. As a result, latent images corresponding to the laser beams are formed on the photosensitive drums 245, 246, 247, and 248.

A print paper sheet fed from one of paper cassettes 256 and 257 and a manual feed tray 259 passes between registration rollers 250 and is conveyed by a transfer belt 251. A paper feed roller 258 picks up the print paper sheets one by one, thereby feeding the paper sheet from the paper cassette 256 or 257 or the manual feed tray 259. It is also possible to feed a printing medium such as an OHP sheet except paper.

Developers sticking to the photosensitive drums 245, 246, 247, and 248 are transferred to the print paper sheet conveyed by the transfer belt 251 in synchronism with the start of laser beam irradiation.

The print paper sheet with the transferred developers is conveyed to a fixing unit 252. The fixing unit 252 executes a fixing process using heat and pressure.

The print paper sheet that has passed through the fixing unit 252 is discharged by discharge rollers 253. A discharge unit 260 bundles and sorts the discharged print paper sheets or staples the sorted print paper sheets.

When double-sided printing is designated, the print paper sheet conveyed up to the discharge rollers 253 is guided to a paper re-feeding path 255 by a flapper 254 by reversing the rotational directions of the discharge rollers 253. The print paper sheet guided to the re-feeding path 255 is conveyed by the transfer belt 251 again.

Figure 3:
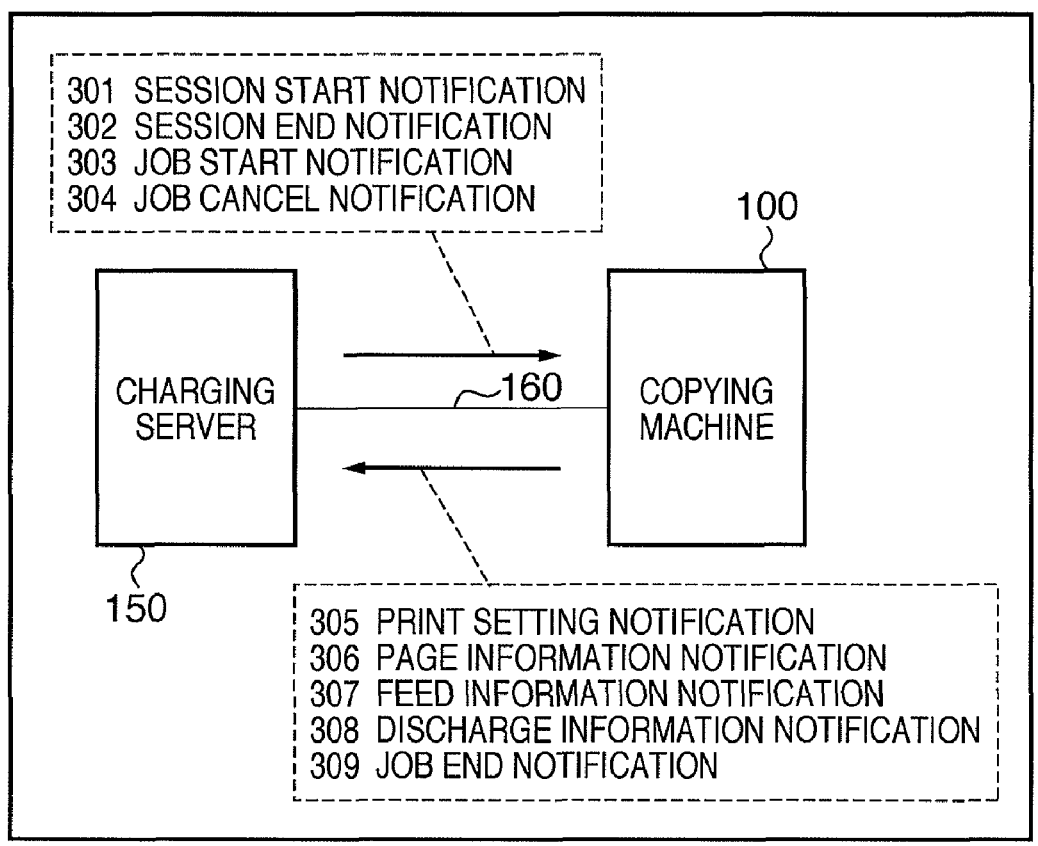
FIG. 3 is a view showing information transmitted by an interface 160 according to the embodiment of the present invention.

FIG. 3 is a view showing information transmitted between the copying machine 100 and the charging server 150 via the interface 160. The copying machine 100 and charging server 150 transmit/receive pieces of information 301 to 309 shown in FIG. 3 via the interface 160. The pieces of information 301 to 304 are sent from the charging server 150 to the copying machine 100. The pieces of information 305 to 309 are sent from copying machine 100 to the charging server 150.

The charging server 150 sends the session start notification 301 to notify the copying machine 100 of the start of a service when cash is put into the charging server 150, or a prepaid card or a credit card is inserted. Until receiving the session start notification 301, the copying machine 100 displays a message representing a standby state on the liquid crystal panel unit of the operating unit 120 and does not receive any user operation. Upon receiving the session start notification 301 from the charging server 150, the copying machine 100 displays a window to do print settings for a copy process or a print process.

The session start notification 301 contains charging method selection information representing the charging method selected by the user on the charging server 150. The copying machine 100 determines the charging method selected by the user on the basis of the charging method selection information and controls execution of the print process on the basis of the determination result.

The charging server 150 sends the session end notification 302 to notify the copying machine 100 of the end of a service when the balance of cash put into the charging server 150 becomes zero, or a prepaid card or a credit card is ejected. If a print process is progressing at the time of reception of the session end notification 302, the copying machine 100 interrupts execution of the print process and displays, on the liquid crystal panel unit, a window to prompt the user to make an additional payment. If no print process is progressing, the copying machine 100 displays a message representing a standby state on the liquid crystal panel unit.

Upon determining whether a print process can be executed and determining that execution of the print process is possible, the charging server 150 sends the job start notification 303 to notify the copying machine 100 that execution of the print process is permitted. At this time, the charging server 150 executes the above determination based on the balance information managed by the charging information managing unit 152 and the print setting notification 305 and page information notification 306 to be described later. Upon receiving the job start notification 303, the copying machine 100 starts executing the print process.

Upon determining in the above-described determination that execution of the print process is impossible, the charging server 150 sends the job cancel notification 304 to notify the copying machine 100 that execution of the print process is inhibited. The job cancel notification 304 contains shortfall information representing the balance due to execution of the print process, which is obtained by the above-described determination by the charging server 150. The copying machine 100 displays information representing the balance due on the liquid crystal panel unit based on the shortfall information.

The print setting notification 305 notifies the charging server 150 of print settings designated by the user on the copying machine 100. Examples of print settings designable on the copying machine 100 are post-process settings such as stapling, punching, and folding, color/monochrome setting, and single-sided/double-sided setting.

The page information notification 306 notifies the charging server 150 of the size and number of print paper sheets to be used for a print process. The charging server 150 calculates the total charge necessary for execution of the print process on the basis of the print setting notification 305, page information notification 306, and print charge information managed by the charging information managing unit 152. Then, the charging server 150 determines whether a balance corresponding to the calculated total charge remains by comparing the calculated total charge with a balance represented by balance information, thereby determining whether execution of the print process is possible.

The copying machine 100 outputs the feed information notification 307 to the charging server 150 every time the paper feed roller 258 picks up a print paper sheet from one of the paper cassettes 256 and 257, manual feed tray 259, and paper re-feeding path 255 for double-sided printing. The feed information notification 307 contains information representing the size of the fed paper.

The copying machine 100 outputs the discharge information notification 308 to the charging server 150 every time a print paper sheet passes between the discharge rollers 253. The discharge information notification 308 contains information, representing the size of discharged paper and information representing an executed post-process.

Upon ending a series of print processes, the copying machine 100 sends the job end notification 309 to notify the charging server 150 of it.

FIGS. 4 to 8 are flowcharts for explaining a series of processes of causing the charging server 150 to execute charging for a print process executed by the copying machine 100 according to the first embodiment. The CPU 111 of the copying machine 100 controls the series of operations shown in FIGS. 4 to 6 on the basis of programs stored in the internal memories of the control unit 110. The control unit 151 of the charging server 150 controls the series of operations shown in FIGS. 7 and 8 on the basis of programs stored in memories (not shown).

In step S401, the copying machine 100 displays a standby window representing a standby state on the liquid crystal panel unit of the operating unit 120. In step S402, the copying machine 100 determines whether to start a service. More specifically, the copying machine 100 determines in step S402 whether the session start notification 301 is received from the charging server 150. Upon receiving the session start notification 301, the copying machine 100 determines to start a service, and the process advances to step S403.

In step S403, the copying machine 100 determines, on the basis of charging method selection information contained in the session start notification 301 received in step S402, the charging method selected by the user on the charging server 150.

In step S404, the copying machine 100 determines whether the determination result in step S403 indicates that the user has selected a print charge paying method using cash put into the coin vendor. If YES in step S404, the process advances to step S601. Otherwise, the process advances to step S405.

In step S405, the copying machine 100 determines whether the determination result in step S403 indicates that the user has selected a print charge paying method using a prepaid card. If YES in step S405, the process advances to step S601. Otherwise, the process advances to step S406.

The charging methods selectable on the charging server 150 are "coin vendor", "prepaid card", and "credit card". If it is determined in step S405 that the selected charging method is not "prepaid card", the user should have selected "credit card". In step S406, the copying machine 100 determines whether the usable amount of the credit card inserted in the credit card reading unit 156 is equal to or larger than a predetermined amount.

The session start notification 301 also contains information representing whether the usable amount of the credit card is equal to or larger than the predetermined amount. The copying machine 100 therefore performs the determination based on this information. If it is determined in step S406 that the usable amount of the credit card is equal to or larger than the predetermined amount, the process advances to step S501. Otherwise, the process advances to step S601.

In step S501, the copying machine 100 receives print settings from the user via an operation window displayed on the liquid crystal panel unit. In step S502, the copying machine 100 determines whether the user has input a print process execution instruction by detecting press of a start button of the operating unit 120. If it is determined that the execution instruction is input, the process advances to step S503. Without the execution instruction from the user, the process returns to step S501 to succeedingly receive print settings.

In step S503, the copying machine 100 determines the type of the print process designated by the user, copy or printing. For copy, the process advances to step S504. For printing, the process advances to step S507.

Copy is a process of causing the scanner 130 of the copying machine 100 to read an image on a document and output it, and causing the printer 140 to print the image on a print paper sheet. Printing is a process of causing the printer 140 to print, on a print paper sheet, image data received from a host computer or a server connected to the copying machine 100 or image data read out from a portable storage medium detachable from the copying machine 100.

In step S504, the scanner 130 operates and reads an image on a document. In step S505, the printer 140 starts a print process based on the image data output from the scanner 130. In step S506, the copying machine 100 determines whether the next page of the document is set on the document conveying unit 131. If the next page exists, the process returns to step S504 to continue document reading. Without the next page, the copying machine 100 determines that all pages are read, and the process advances to step S510.

On the other hand, in step S507, the copying machine 100 rasterizes image data input from, e.g. a host computer, as described above, into a state printable by the printer 140. In step S508, the printer 140 starts a print process based on the rasterized image data. In step S509, the copying machine 100 determines whether the next page to be rasterized exists. If the next page exists, the process returns to step S507 to continue image data rasterization. Without the next page, the copying machine 100 determines that all pages are rasterized, and the process advances to step S510.

Note that the copying machine 100 transmits the above-described feed information notification 307 and discharge information notification 308 to the charging server 150 as the print process started in step S505 or S508 progresses.

In step S510, the copying machine 100 determines whether all pages of the print process target are printed. If it is determined that the print process is ended, the process advances to step S511 to transmit the job end notification 309 to the charging server 150.

As described above, in the first embodiment, when the user selects "credit card" as the charging method, and the usable amount of the credit card is equal to or larger than a predetermined amount, the copying machine starts the print process in parallel to the document reading process or the image data rasterization process. This is because in payment using a credit card, it is unnecessary to confirm the balance unless the used amount reaches the line of credit.

In this way, the copying machine starts the print process without determining before the start of the print process whether execution of the print process is possible. This shortens the waiting time in the print process and increases the print efficiency.

On the other hand, when the user selects "coin vendor" or "prepaid card" as the charging method, or when the user selects "credit card", and the usable amount is smaller than the predetermined amount, the process advances to step S601. In step S601, the copying machine 100 receives print settings from the user via an operation window displayed on the liquid crystal panel unit.

In step S602, the copying machine 100 determines whether the user has input a print process execution instruction by detecting press of a start button of the operating unit 120. If it is determined that the execution instruction is input, the process advances to step S603. Without the execution instruction from the user, the process returns to step S601 to succeedingly receive print settings.

In step S603, the copying machine 100 determines, the type of the print process designated by the user, copy or printing. For copy, the process advances to step S604. For printing, the process advances to step S606.

In step S604, the scanner 130 operates and reads an image on a document. In step S605, the copying machine 100 determines whether the next page of the document is set on the document conveying unit 131. If the next page exists, the process returns to step S604 to continue document reading. Without the next page, the copying machine 100 determines that all pages are read, and the process advances to step S608.

On the other hand, in step S606, the copying machine 100 rasterizes image data input from, e.g. a host computer, as described above, into a state printable by the printer 140. In step S607, the copying machine 100 determines whether the next page to be rasterized exists. If the next page exists, the process returns to step S606 to continue image data rasterization. Without the next page, the copying machine 100 determines that all pages are rasterized, and the process advances to step S608.

In step S608, the copying machine 100 transmits the print setting notification 305 to the charging server 150 to notify it of the print settings received in step S601. In step S609, the copying machine 100 transmits the page information notification 306 to the charging server 150 on the basis of the result of document reading in step S604 or the result of image data rasterization in step S606.

In step S610, the copying machine 100 determines whether to permit execution to the print process depending on which one of the job start notification 303 and the job cancel notification 304 is received from the charging server 150. Upon receiving the job start notification 303 from the charging server 150, the copying machine 100 permits execution of the print process. The process advances to step S611 to start the print process.

In step S612, the copying machine 100 determines whether all pages of the print process target are printed. If it is determined that the print process is ended, the process advances to step S613 to transmit the job end notification 309 to the charging server 150. Note that the copying machine 100 transmits the above-described feed information notification 307 and discharge information notification 308 to the charging server 150 as the print process started in step S612 progresses.

If it is determined in step S610 that the job cancel notification 304 is received from the charging server 150, the copying machine 100 inhibits execution of the print process, and the process advances to step S614. In step S614, the copying machine 100 displays, on the liquid crystal panel unit, a message to inquire of the user about whether to cancel the print process and determines whether the user has input a cancel instruction.

If the user has instructed to cancel the print process in step S614, the process advances to step S613 to transmit the job end notification 309 to the charging server 150. If the user has instructed to continue the print process in step S614, the process advances to step S615. The copying machine 100 displays a message representing the balance due on the liquid crystal panel unit on the basis of the shortfall information contained in the job cancel notification 304, and the process returns to step S610. At this time, if the user additionally pays the balance due, execution of the print process is permitted in step S610.

As described above, in the first embodiment, when the user selects "coin vendor" or "prepaid card", or when the user selects "credit card", and the usable amount of the credit card is smaller than a predetermined amount, execution of the print process is controlled in the following way.

After the document reading process or the image data rasterization process of all pages of the print process target is ended, the copying machine 100 inquires of the charging server 150 about whether execution of the print process is possible. Control is done to execute the print process or inhibit execution of the print process in accordance with the response from the charging server 150 for the inquiry.

This is because in payment using a coin vendor or a prepaid card, the print process must be performed within the range of the balance of cash put in advance, and it is therefore necessary to confirm before the start of the print process whether execution of the print process is possible. Especially when the charging apparatus and the image forming apparatus are separately provided, as in the first embodiment, the print process cannot stop immediately even when the balance runs short during the progress, and the printing is done beyond the paid amount.

However, when the print process is started after determining in advance whether execution of the print process is possible, as described above, any balance shortage during the progress of the print process can be prevented. It is therefore possible to appropriately control execution of the print process.

Figure 7:
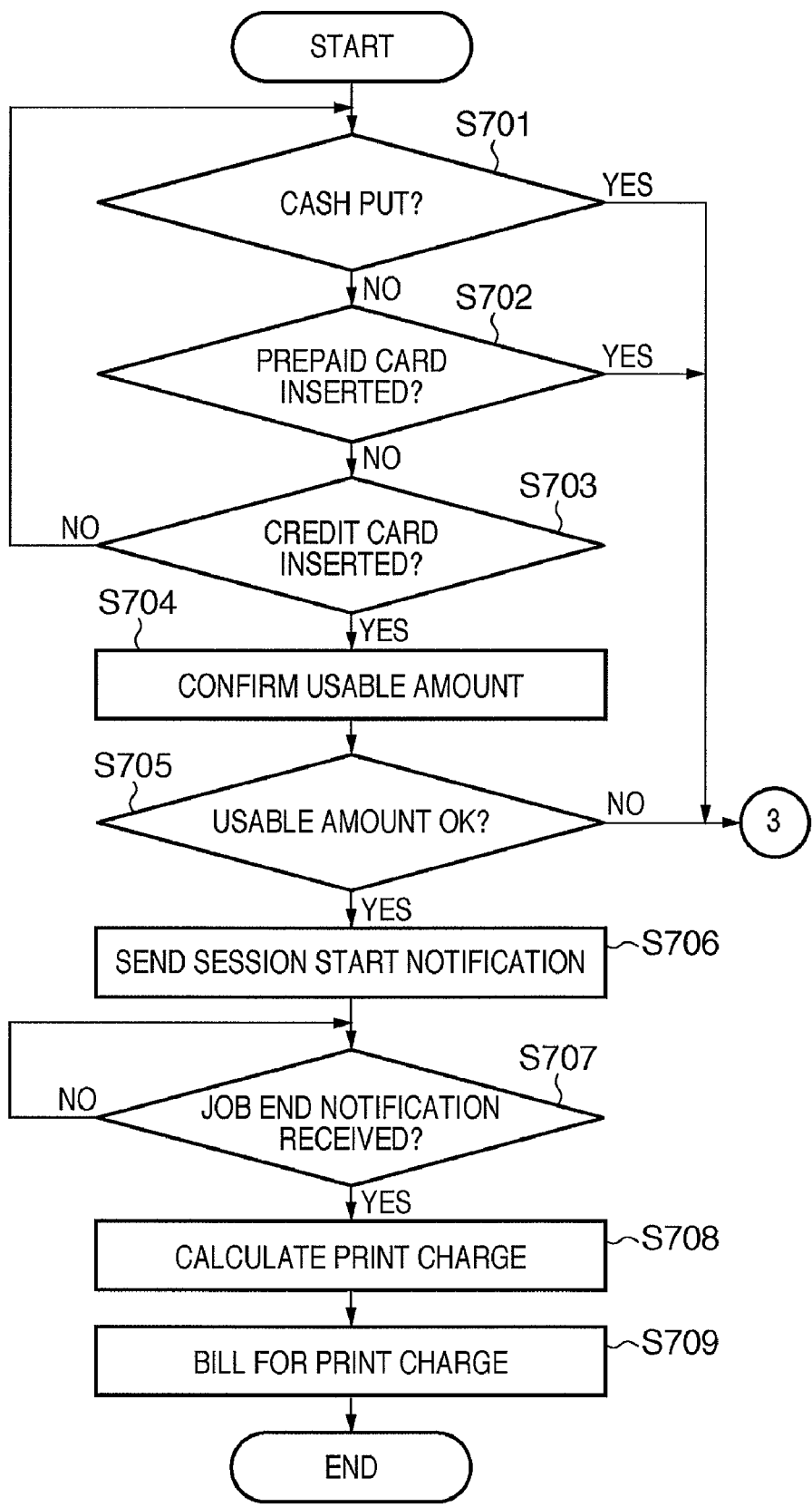
FIG. 7 is a flowchart for explaining the operation of a charging server 150 according to the embodiment of the present invention.

The operation of the charging server 150 will be described next with reference to FIGS. 7 and 8. In step S701, the charging server 150 determines whether the user has put coins into the coin vendor unit 154. If it is determined that the user has put coins into the coin vendor unit 154, the process advances to step S801. Otherwise, the process advances to step S702.

In step S702, the charging server 150 determines whether the user has inserted a prepaid card in the prepaid card reading unit 155. If it is determined that the user has inserted a prepaid card in the prepaid card reading unit 155, the process advances to step S801. Otherwise, the process advances to step S703.

In step S703, the charging server 150 determines whether the user has inserted a credit card in the credit card reading unit 156. If it is determined that the user has inserted a credit card in the credit card reading unit 156, the process advances to step S704. Otherwise, the process returns to step S701.

In step S704, the communicating unit 157 communicates with the credit card company on the basis of information read from the inserted credit card by the credit card reading unit 156 and confirms the usable amount of the credit card.

In step S705, the charging server 150 determines whether the confirmation result in step S704 indicates that the usable amount of the credit card is equal to or larger than a predetermined amount. If the usable amount is equal to or larger than the predetermined amount, the process advances to step S706. Otherwise, the process advances to step S801.

In step S706, the charging server 150 transmits the session start notification 301 to the copying machine 100. In step S707, the charging server 150 determines whether the job end notification 309 is received from the copying machine 100. Upon receiving the job end notification 309 from the copying machine 100, the process advances to step S708 to calculate a print charge for the executed print process on the basis of the feed information notification 307 and the discharge information notification 308 separately transmitted from the copying machine 100.

In step S709, the communicating unit 157 communicates with the credit card company and bills it for the print charge calculated din step S708.

On the other hand, in step S801, the charging server 150 transmits the session start notification 301 to the copying machine 100. The process advances to step S802 to determine whether the print setting notification 305 is received from the copying machine 100. If it is determined that the print setting notification 305 is received, the process advances to step S803 to determine whether the page information notification 306 is received from the copying machine 100.

If it is determined that the page information notification 306 is received, the process advances to step S804 to determine whether execution of the print process is possible. More specifically, the charging server 150 calculates the total charge necessary for execution of the print process first on the basis of the print setting notification 305 and page information notification 306 received from the copying machine 100. Then, the charging server 150 determines whether a balance corresponding to the calculated total charge remains by referring to the balance information read out from the charging information managing unit 152.

In step S805, the charging server 150 determines whether to permit execution of the print process on the basis of the result of determination in step S804. More specifically, if a balance corresponding to the total charge necessary for execution of the print process exists, the process advances to step S806. Otherwise, the process advances to step S811.

In step S806, the charging server 150 transmits the job start notification 303 to the copying machine 100. In step S807, the charging server 150 determines whether the job end notification 309 is received from the copying machine 100. Upon receiving the job end notification 309, the charging server 150 finishes the series of processes. Otherwise, the process advances to step S808.

In steps S808 and S809, the charging server 150 determines whether the feed information notification 307 and the discharge information notification 308 are received from the copying machine 100. Upon receiving both the feed information notification 307 and the discharge information notification 308, the process advances to step S810. In step S810, the charging server 150 updates the balance information by decreasing the balance represented by the balance information managed by the charging information managing unit 152, and the process returns to step S807.

In step S811, the charging server 150 transmits the job cancel notification 304 to the copying machine 100. In step S812, the charging server 150 determines whether the job end notification 309 is received from the copying machine 100. Upon receiving the job end notification 309, the charging server 150 finishes the series of processes. Otherwise, the process returns to step S802.

As described above, in the first embodiment, the control unit 151 functioning as a charging unit in the charging server 150 executes charging for a print process executed by the printer 140 functioning as a printing unit. More specifically, the control unit 151 executes charging by decreasing the balance represented by the balance information managed by the charging information managing unit 152 functioning as a managing unit. Alternatively, the control unit 151 communicates with a credit card company on the basis of information read by the credit card reading unit 156 functioning as a card reading unit by controlling the communicating unit 157, and bills the credit card company for the print charge, thereby executing charging.

The control unit 151 functioning as a second determining unit determines, before the copying machine 100 starts the print process, whether the usable amount of the credit card inserted in the credit card reading unit 156 is equal to or larger than a predetermined amount.

Additionally, in the first embodiment, execution of the print process is controlled depending on which one of the first charging method (e.g., coin vendor unit or prepaid card) and the second charging method (e.g., credit card) is selected.

More specifically, when the user has selected the first charging method, the control unit 151 functioning as a first determining unit in the charging server 150 determines on the basis of the above-described balance information whether execution of the print process is possible before the start of the print process. The CPU 111 functioning as a control unit in the copying machine 100 controls execution of the print process on the basis of the result of determination. On the other hand, when the user has selected the second charging method, the CPU 111 functioning as a control means in the copying machine 100 causes the printer 140 to execute the print process without the above-described determination.

When image data obtained by causing the scanner 130 to read a document including a plurality of pages is to be printed, the above-described determination is done after the scanner 130 has read the document including the plurality of pages. On the other hand, if the second charging method is selected, the above-described is not performed. Hence, the printer 140 starts the print process before the scanner 130 finishes reading of the document including the plurality of pages.

In this way, when a charging method (first charging method) which may cause balance shortage during the progress of a print process is selected, it is determined before the start of the print process whether the print process can be executed. Execution of the print process is controlled on the basis of the determination result. When a charging method (second charging method) which rarely causes balance shortage during the progress of a print process is selected, the print process is executed without determination. This makes it possible to appropriately control execution of a print process in accordance with the selected charging method.

Second Embodiment

The second embodiment will be described next. In the first embodiment, when the user selects "coin vendor" or "prepaid card" as the charging method, or when the user selects "credit card", and the usable amount is small, it is always determined before the start of a print process whether the print process can be executed. In the second embodiment, however, even when these charging methods are selected, a print process can be executed in accordance with preset contents without determining before the start of the print process whether execution of the print process is possible.

The basic arrangement of the second embodiment is the same as in the first embodiment, and a detailed description thereof will not be repeated. Different points between the first embodiment and the second embodiment will be described below.

FIG. 9 is a view showing a setting window displayed on the liquid crystal panel unit of an operating unit 120. The administrator of a copying machine 100 can set in advance, via the setting window, whether to determine before the start of a print process whether the print process can be executed. To set to determine before the start of a print process whether execution of the print process is possible, the administrator selects "ON" 901. Otherwise, the administrator selects "OFF" 902. The setting is completed by pressing an OK button 903.

Figure 10:
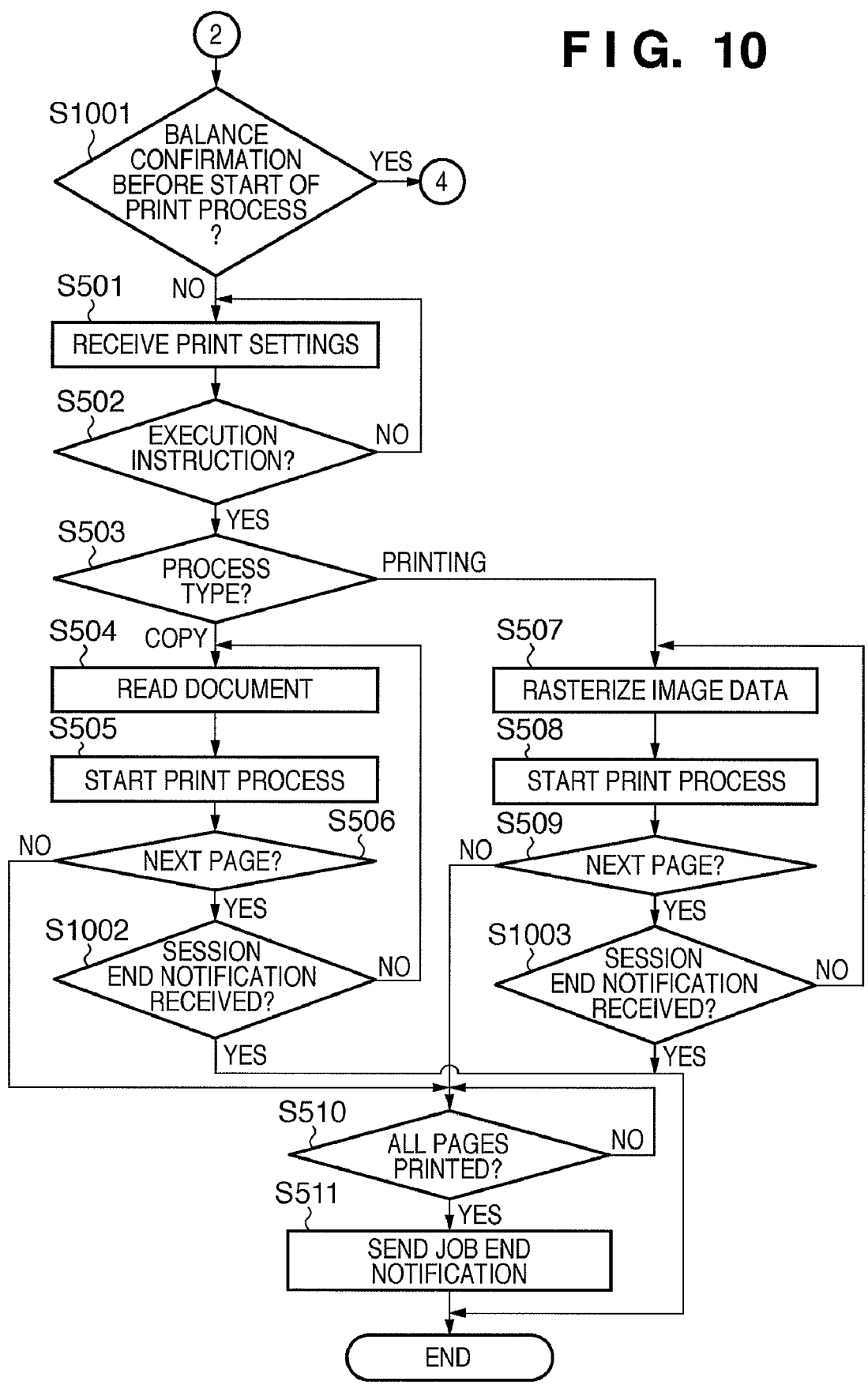
FIG. 10 is a flowchart for explaining the operation of the copying machine 100 according to the embodiment of the present invention.
Figure 11:
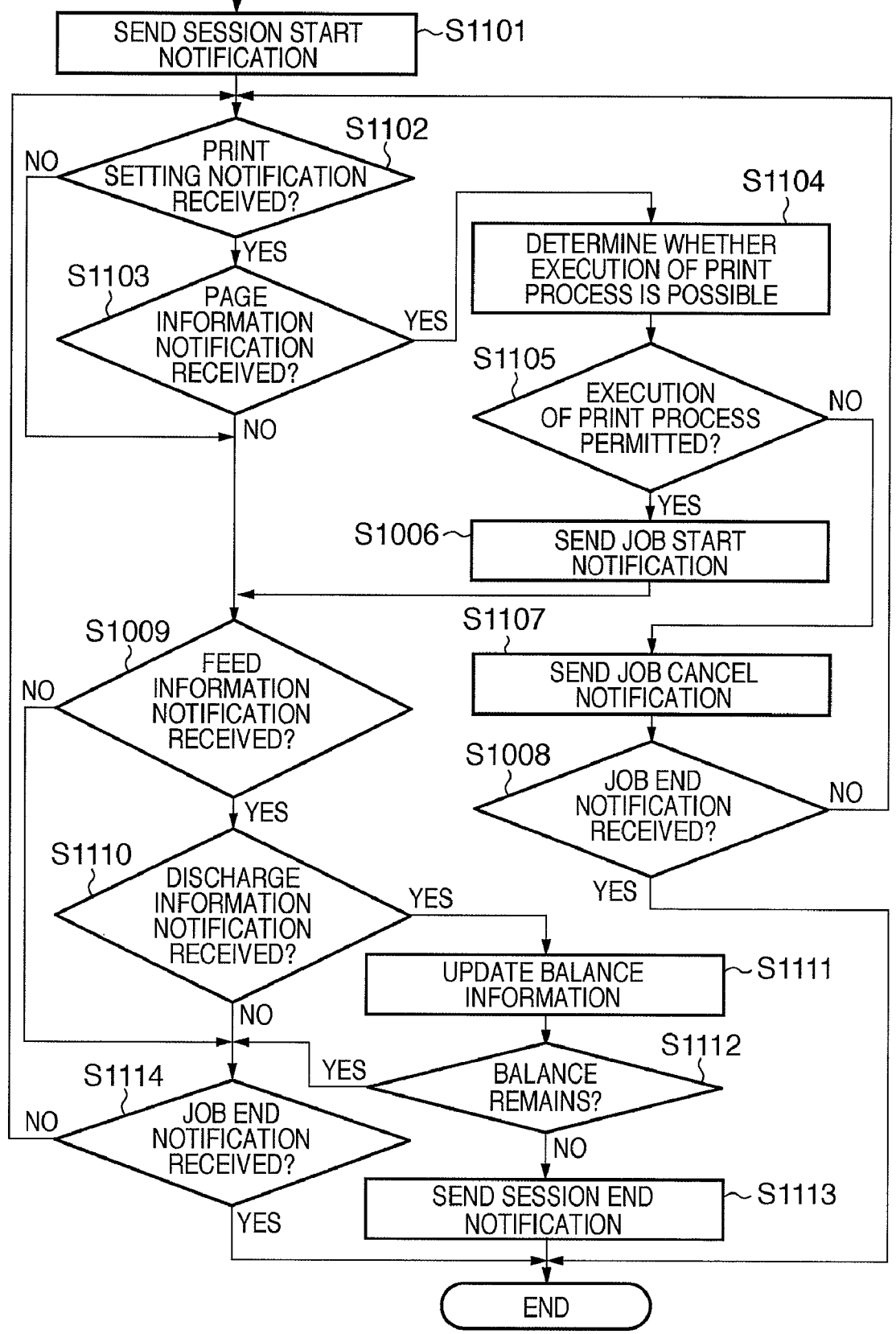
FIG. 11 is a flowchart for explaining the operation of the charging server 150 according to the embodiment of the present invention.

FIGS. 10 and 11 are flowcharts for explaining a series of operations of causing a charging server 150 to execute charging for a print process executed by the copying machine 100 according to the second embodiment. A CPU 111 of the copying machine 100 controls the series of operations shown in FIG. 10 on the basis of programs stored in the internal memories of a control unit 110. A control unit 151 of the charging server 150 controls the series of operations shown in FIG. 11 on the basis of programs stored in memories (not shown).

Figure 5:
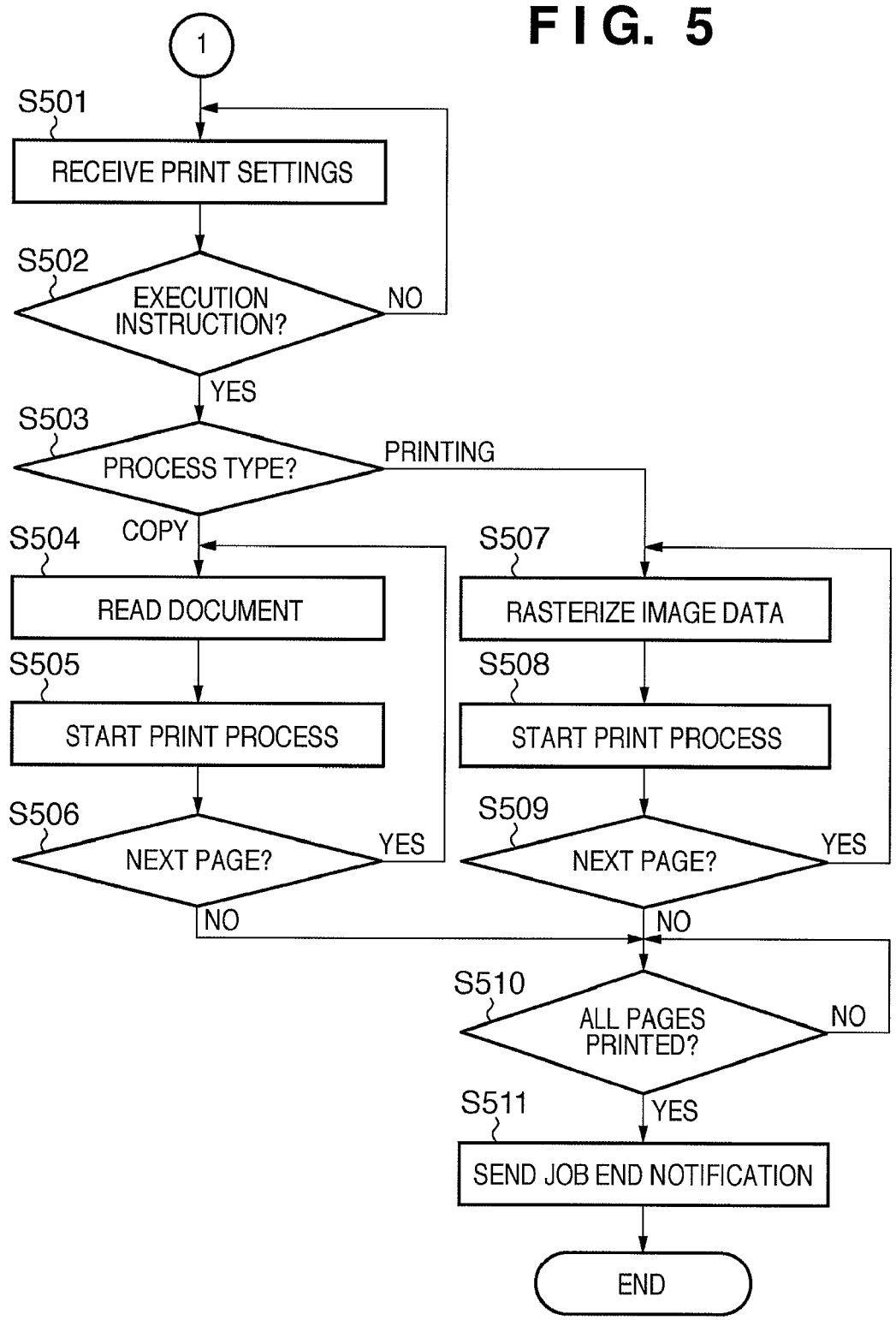
FIG. 5 is a flowchart for explaining the operation of the copying machine 100 according to the embodiment of the present invention.
Figure 6:
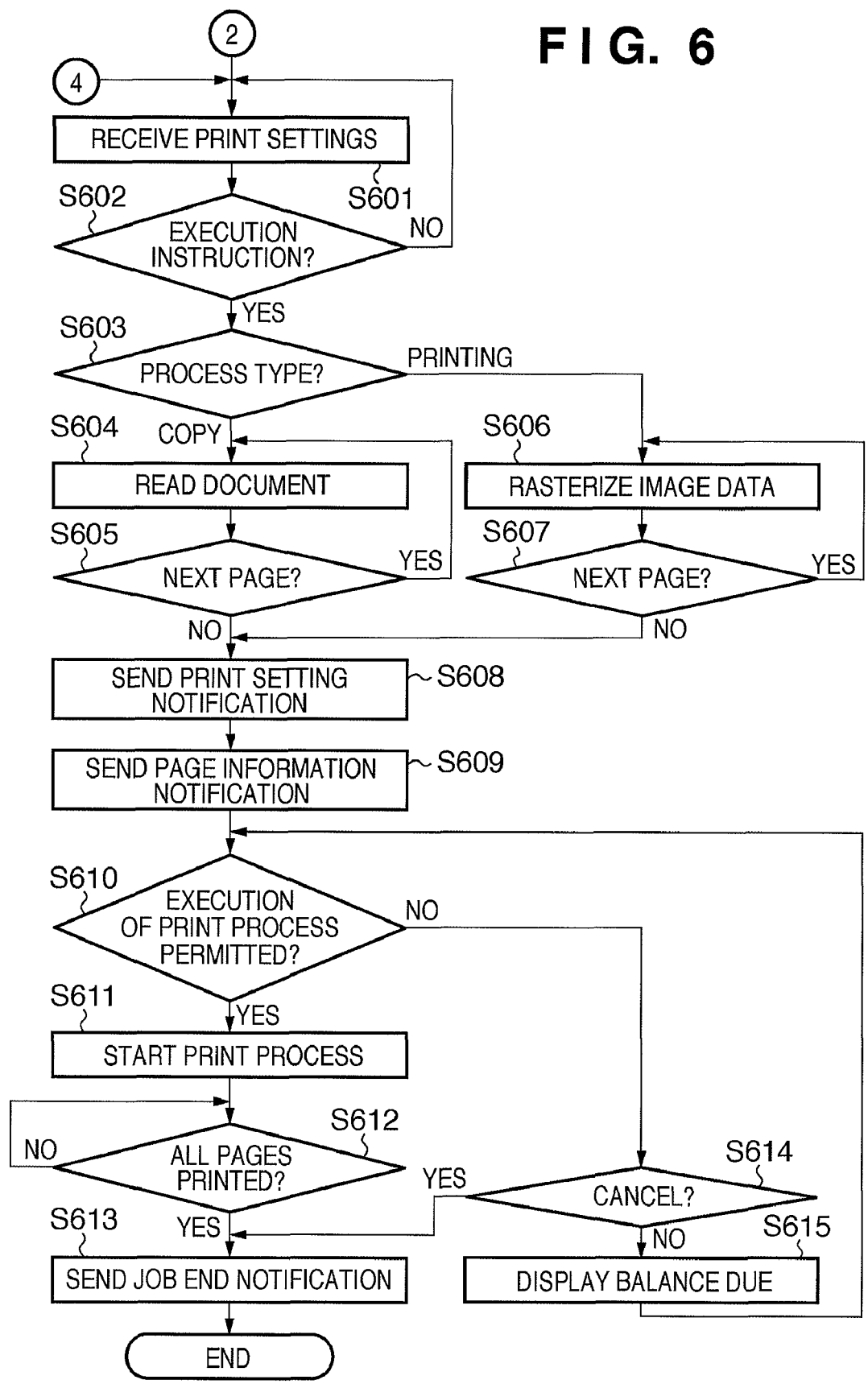
FIG. 6 is a flowchart for explaining the operation of the copying machine 100 according to the embodiment of the present invention.
Figure 8:
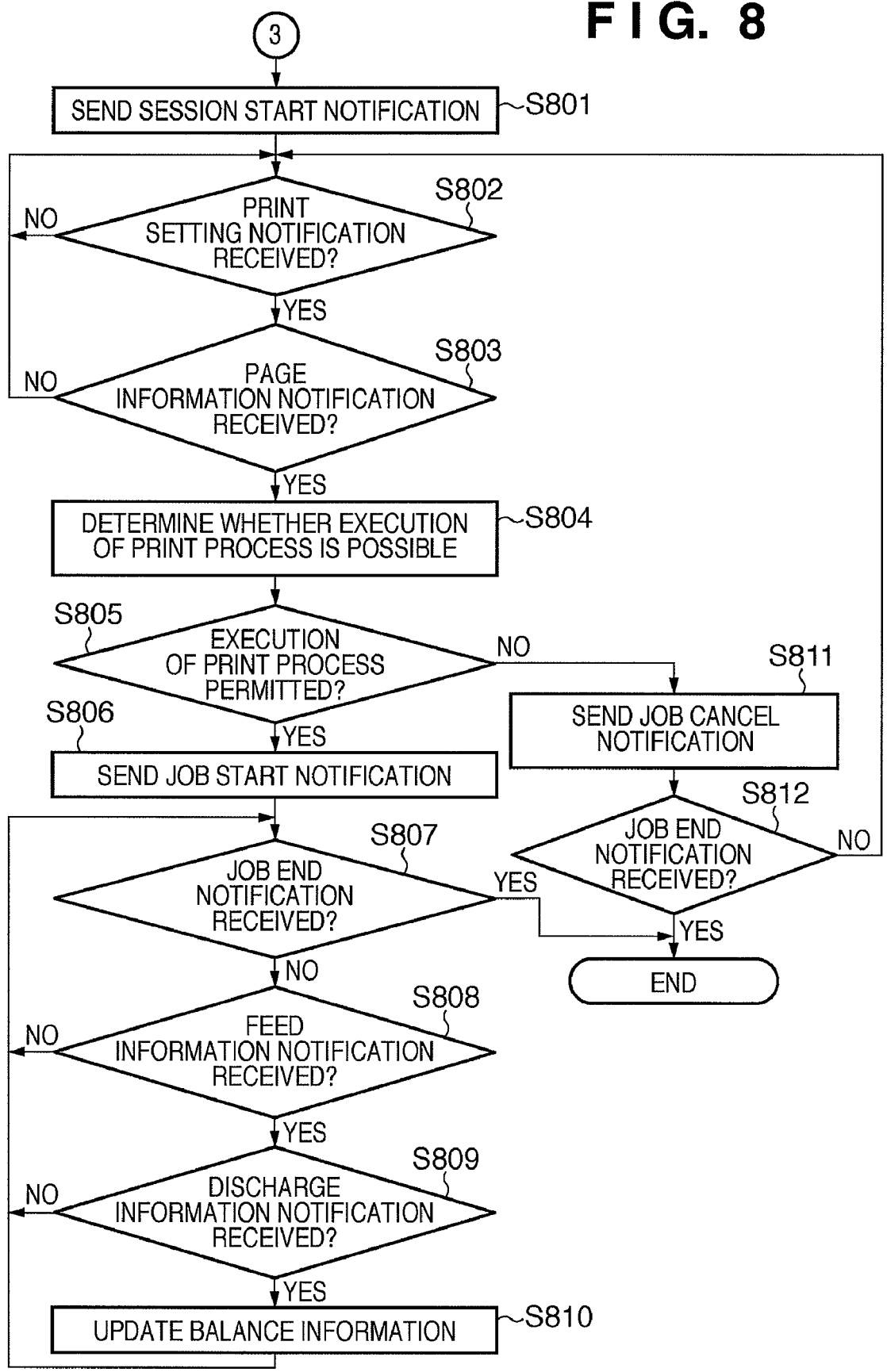
FIG. 8 is a flowchart for explaining the operation of the charging server 150 according to the embodiment of the present invention.

FIGS. 10 and 11 correspond to FIGS. 6 and 8 of the first embodiment, respectively. Steps S501 to S511 in FIG. 10 are the same as those described with reference to FIG. 5, and a description thereof will not be repeated. Steps S1001 to S1003 in FIG. 10 will be described below.

Figure 4:
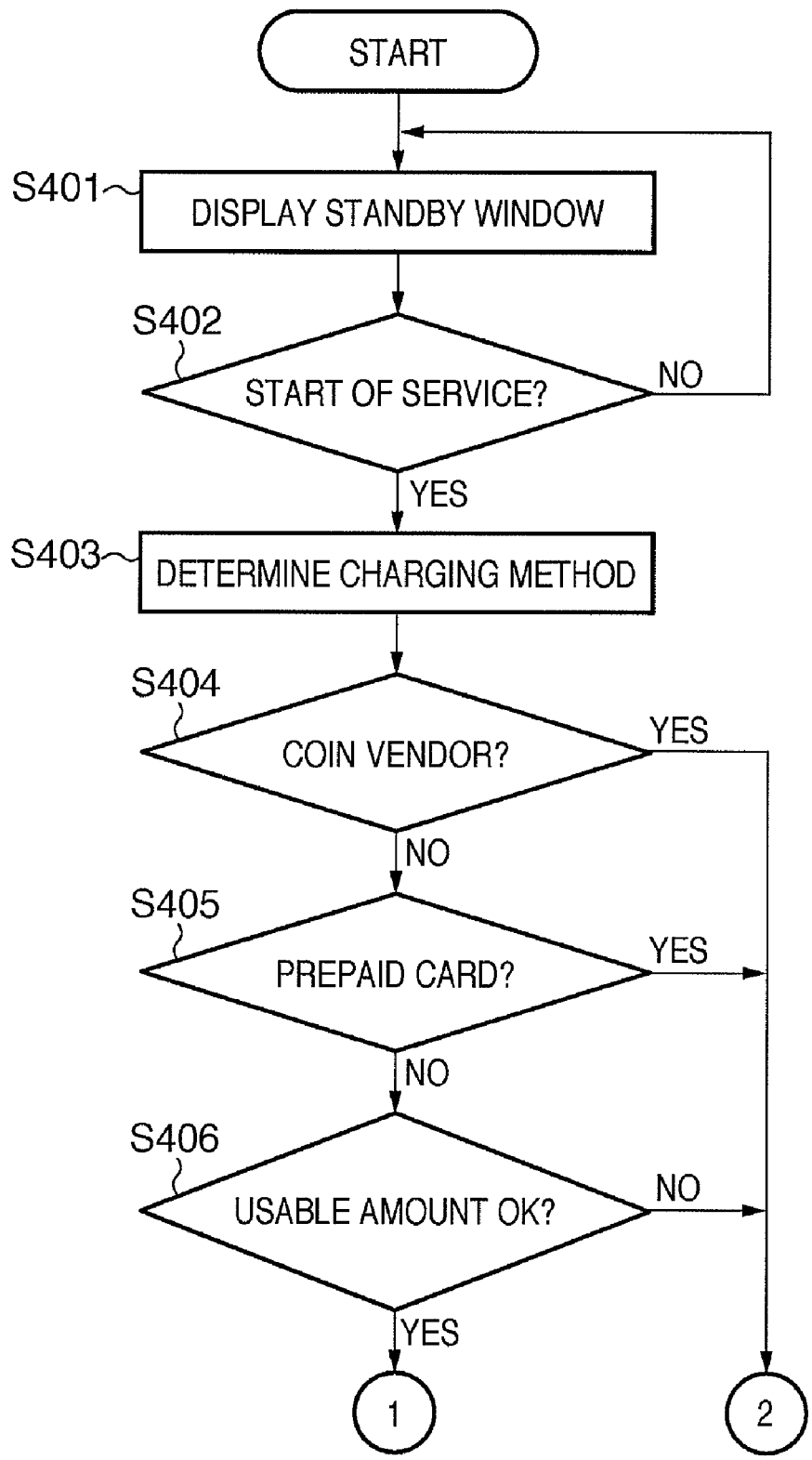
FIG. 4 is a flowchart for explaining the operation of the copying machine 100 according to the embodiment of the present invention.

If YES in step S404 or S405, or NO in step S406 in the flowchart of FIG. 4, the process advances to step S1001 in FIG. 10. In step S1001, the copying machine 100 determines in accordance with contents set via the setting window shown in FIG. 9 whether a setting is done to determine on the basis of balance information before the start of the print process whether execution of the print process is possible.

If the setting is done to do determination, the process advances to step S601 in FIG. 6 to control the operation in the way described in the first embodiment. If the setting is done not to do determination, the process advances to step S501.

If the copying machine 100 determines in step S506 that the next page of the document is set on a document conveying unit 131, the process advances to step S1002 to determine whether a session end notification 302 is received from the charging server 150. The charging server 150 transmits the session end notification 302 to the copying machine 100 when the balance of cash put into the charging server 150 becomes zero, or a prepaid card or a credit card is ejected, as described above.

If it is determined in step S1002 that the session end notification 302 is not received, the process returns to step S504 to continue the reading process. Upon receiving the session end notification 302, the copying machine 100 finishes the series of processes even if an unprinted page remains. At this time, a message to prompt the user to make an additional payment is displayed on the liquid crystal panel unit of the operating unit 120.

In step S509, the copying machine 100 determines whether the next page to be rasterized exists. If it is determined that the next page exists, the process returns to step S1003 to determine whether the session end notification 302 is received from the charging server 150.

If it is determined in step S1003 that the session end notification 302 is not received, the process returns to step S507 to continue the rasterization process. Upon receiving the session end notification 302, the copying machine 100 finishes the series of processes even if an unprinted page remains. At this time, a message to prompt the user to make an additional payment is displayed on the liquid crystal panel unit of the operating unit 120.

In the print process according the flowchart shown in FIG. 10, the CPU 111 of the copying machine 100 controls a printer 140 to execute the print process at a lower speed than in the print process according to the flowchart shown in FIG. 5 or 6. More specifically, the paper conveyance interval is made large when feeding print paper sheets from one of paper cassettes 256 and 257 and a manual feed tray 259.

Especially when the user selects "coin vendor" or "prepaid card" as the charging method, the balance may run out during the process of a print process. However, when the paper conveyance interval is large, the print process can stop immediately even when the balance has run out. This prevents the print process from being executed beyond the paid amount.

The operation of the charging server 150 according to the second embodiment will be described next with reference to FIG. 11. If YES in step S701 or S702, or NO in step S705 in the flowchart of FIG. 7, the process advances to step S1101 in FIG. 11.

In step S1101, the charging server 150 transmits a session start notification 301 to the copying machine 100. The process advances to step S1102 to determine whether a print setting notification 305 is received from the copying machine 100. If it is determined that the print setting notification 305 is received, the process advances to step S1103 to determine whether a page information notification 306 is received from the copying machine 100.

If it is determined that the page information notification 306 is received, the process advances to step S1104 to determine whether execution of the print process is possible. More specifically, the charging server 150 calculates the total charge necessary for execution of the print process first on the basis of the print setting notification 305 and page information notification 306 received from the copying machine 100. Then, the charging server 150 determines whether a balance corresponding to the calculated total charge remains by referring to the balance information read out from a charging information managing unit 152.

In step S1105, the charging server 150 determines whether to permit execution of the print process on the basis of the result of determination in step S1104. More specifically, if a balance corresponding to the total charge necessary for execution of the print process exists, the process advances to step S1106. Otherwise, the process advances to step S1107. In step S1106, the charging server 150 transmits a job start notification 303 to the copying machine 100.

In step S1107, the charging server 150 transmits a job cancel notification 304 to the copying machine 100. In step S1108, the charging server 150 determines whether a job end notification 309 is received from the copying machine 100. Upon receiving the job end notification 309, the charging server 150 finishes the series of processes. Otherwise, the process returns to step S1102.

On the other hand, if the print setting notification 305 is not received in step S1102, if the page information notification 306 is not received in step S1103, or after the job start notification 303 is transmitted in step S1106, the process advances to step S1109.

In step S1109, the charging server 150 determines whether a feed information notification 307 is received from the copying machine 100. If the feed information notification 307 is received, the process advances to step S1110. In step S1110, the charging server 150 determines whether a discharge information notification 308 is received from the copying machine 100. If the discharge information notification 308 is received, the process advances to step S1111.

In step S1111, the charging server 150 updates the balance information by decreasing the balance represented by the balance information managed by the charging information managing unit 152, and the process advances to step S1112. In step S1112, the charging server 150 determines whether a balance represented by the balance information managed by the charging information managing unit 152 exists. At this time, the charging server 150 can determine whether the balance is zero or whether the balance is equal to or larger than a predetermined amount.

If it is determined in step S1112 that a balance exists, the process advances to step S1114. Otherwise, the process advances to step S1113. In step S1113, the charging server 150 transmits the session end notification 302 to the copying machine 100 and finishes the series of processes.

In step S1114, the charging server 150 determines whether the job end notification 309 is received from the copying machine 100. Upon receiving the job end notification 309, the charging server 150 finishes the series of processes. Otherwise, the process returns to step S1102.

As described above, in the second embodiment, whether execution of the print process is possible is determined in accordance with contents set via the setting window shown in FIG. 9, which functions as a setting unit, in addition to the functions described in the first embodiment.

This makes it possible to execute a print process without determining before the start of the print process whether the print process can be executed even when a charging method (first charging method) which may cause balance shortage during the progress of the print process is selected. Executing the print process at a low speed allows to take an appropriate action in case of balance shortage during the progress of the print process.

Third Embodiment

In the first and second embodiments, an image processing system including a plurality of apparatuses, i.e., the copying machine 100 and the charging server 150 has been described. In the third embodiment, a case will be described in which a single image forming apparatus has the functions of the image processing system.

Figure 12:
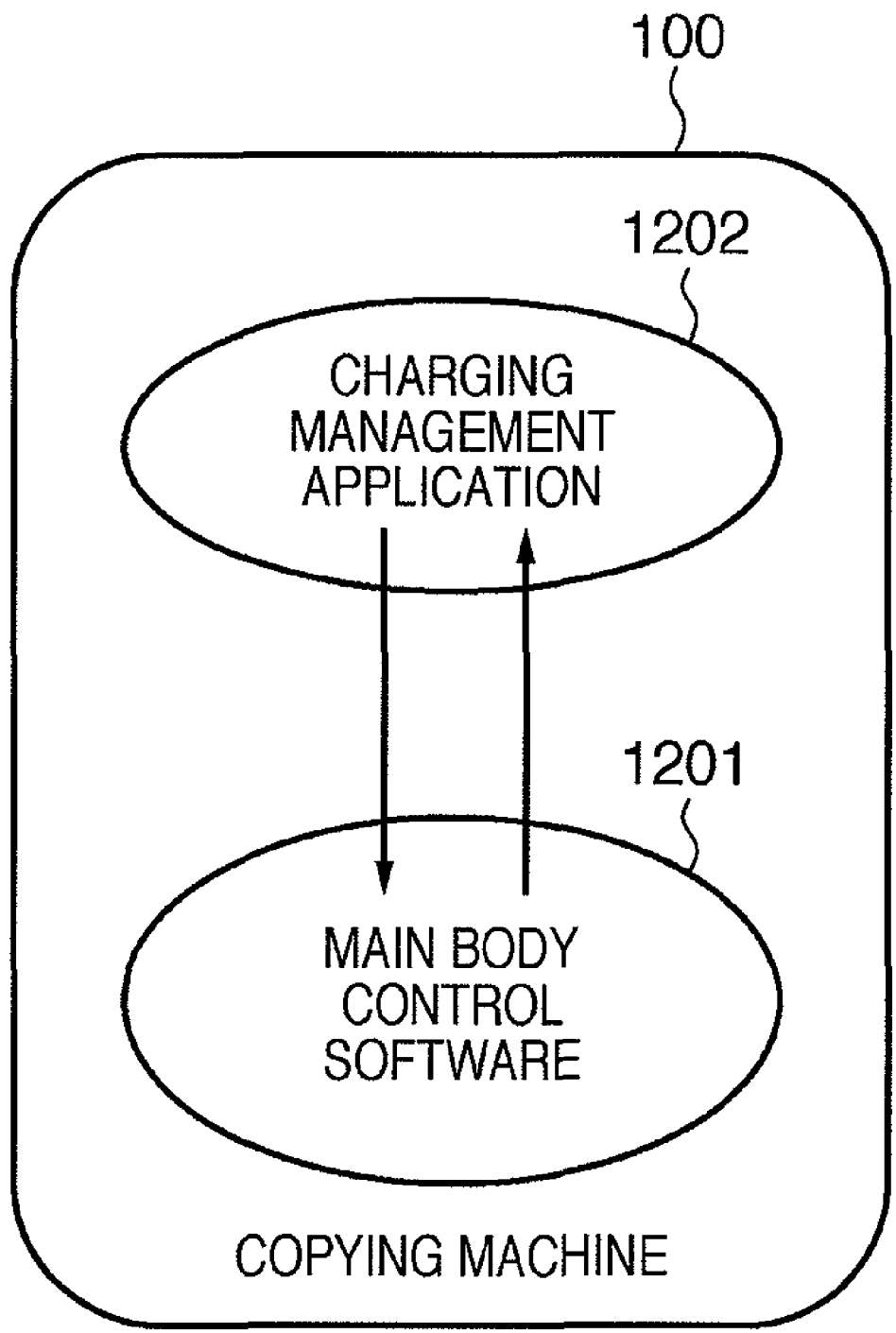
FIG. 12 is a view showing the software configuration of the copying machine 100 according to the embodiment of the present invention.

FIG. 12 is a view showing the software configuration of a copying machine 100 according to the third embodiment. In the third embodiment, the copying machine 100 has the functions of the charging server 150 described in the first and second embodiments. More specifically, not only main body control software 1201 for controlling the main body (scanner 130 and printer 140) of the copying machine 100 but also a charging management application 1202 for managing charging information is installed, as shown in FIG. 12.

The main body control software 1201 transmits/receives pieces of information 301 to 309 to/from the charging management application 1202 and controls execution of a print process on the basis of these pieces of information. The detailed control contents are the same as those described in the first and second embodiments, and a description thereof will not be repeated.

As described above, in the third embodiment, the copying machine 100 manages charging information and controls execution of a print process on the basis of the charging information. For this reason, it is unnecessary to prepare a separate charging apparatus.

Other Embodiments

The embodiments have been described above in detail. The present invention can take a form of a system, apparatus, method, program, or a storage medium (recording medium). More specifically, the present invention is applicable to a system including a plurality of devices or an apparatus including a single device.

The object of the present invention is achieved even by supplying a software program for implementing the functions of the above-described embodiments (in the embodiments, programs corresponding to the illustrated flowcharts) to the system or apparatus directly or from a remote site and causing the computer of the system or apparatus to read out and execute the supplied program codes.

Hence, the program code itself, which is installed in a computer to implement the functional processing of the present invention by the computer, also implements the present invention. That is, the present invention also incorporates the computer program itself for implementing the functional processing of the present invention.

In this case, the program can take any form such as an object code, a program to be executed by an interpreter, or script data to be supplied to the OS as long as the functions of the program can be obtained.

Examples of the computer-readable recording medium to supply the program are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

As another program supply method, a client computer is connected to a homepage on the Internet by using a browser to download the computer program itself of the present invention or a compressed file containing an automatic installation function to a recording medium such as a hard disk. This can also be implemented by dividing the program codes contained in the program of the present invention into a plurality of files and downloading the files from different homepages. That is, a WWW server which causes a plurality of users to download the program file that causes a computer to implement the functional processing of the present invention is also incorporated in the present invention.

The program of the present invention may be encrypted, stored in a storage medium such as a CD-ROM, and distributed to users. Any user who satisfies predetermined conditions can download key information for decryption from a homepage via the Internet. That is, the user can execute the encrypted program using the key information and install the program in the computer.

The functions of the above-described embodiments are also implemented when the computer executes the readout program. The functions of the above-described embodiments are also implemented when, e.g., the OS running on the computer partially or wholly executes actual processing on the basis of the instructions of the program.

The functions of the above-described embodiments are also implemented when the program read out from the recording medium is written in the memory of a function expansion board inserted into the computer or a function expansion unit connected to the computer and executed. More specifically, the CPU of the function expansion board or function expansion unit can partially or wholly execute actual processing on the basis of the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-172738, filed on Jun. 29, 2007, which is hereby incorporated by reference herein in its entirety.

The invention claimed is:

1. An image processing system comprising:
   a printing unit configured to print an image;
   a charging unit configured to execute, using one of a first charging method and a second charging method, charging for a print process executed by said printing unit;
   a selecting unit configured to select, before executing the print process, one of the first charging method and the second charging method according to a user operation;
   a managing unit configured to manage balance information representing a balance usable for charging of the charging unit;
   a first determining unit configured to determine, before a start of the print process of the image including the plurality of pages, on the basis of the balance information managed by said managing unit whether or not the print process is executable; and
   a control unit configured to control execution of the print process on the basis of a result of determination by said first determining unit when the first charging method is selected by said first determining unit, and cause said printing unit to execute the print process without determination by said first determining unit when the second charging method is selected by said selecting unit;
   wherein the image processing system further comprises a setting unit configured to set whether to control execution of the print process on the basis of the result of determination by said first determining unit,
   wherein if said setting unit sets not to control execution of the print process on the basis of the result of determination by said first determining unit, and even if the first charging method is selected, said control unit causes said printing unit to execute the print process without determination by said first determining unit.

2. The image processing system according to claim 1, wherein said first determining unit compares a total charge for the print process of the image including the plurality of pages with the balance represented by the balance information, determines that execution of the print process of the image including the plurality of pages is possible if a balance corresponding to an amount equal to or greater than the total charge exists, and determines that execution of the print process of the image including the plurality of pages is not possible if a balance corresponding to an amount less than the total charge exists.

3. The image processing system according to claim 1, further comprising a reading unit configured to read an image on a document and output image data corresponding to the image,
wherein when said printing unit is going to execute a print process of image data that is output by said reading unit upon reading a document including a plurality of pages, said first determining unit executes the determination after said reading unit has read the document containing the plurality of pages.

4. The image processing system according to claim 3, wherein when the second charging method is selected, and said printing unit is going to execute the print process of the image data that is output by said reading unit upon reading the document including the plurality of pages, said control unit causes said printing unit to start the print process before said reading unit finishes reading the document containing the plurality of pages.

5. The image processing system according to claim 1, wherein the balance information is one of information representing a balance of cash put by a user using a coin vendor and information representing a balance recorded on a prepaid card, and when the first charging method is selected, said charging unit executes charging by decreasing the balance represented by the balance information.

6. The image processing system according to claim 1, further comprising a communicating unit configured to communicate with an external terminal via a network,
wherein when the second charging method is selected, said charging unit executes charging for the print process by billing, via said communicating unit, for a charge of the print process executed by said printing unit.

7. The image processing system according to claim 6, further comprising a card reading unit configured to read information recorded on a credit card,
wherein when the second charging method is selected, said charging unit bills for the charge on the basis of the information read by said card reading unit.

8. The image processing system according to claim 7, further comprising a second determining unit configured to determine on the basis of the information read by said card reading unit, before said printing unit starts the print process, whether a usable amount of the credit card is not less than a predetermined amount,
wherein if said second determining unit determines that the usable amount is less than the predetermined amount, and even if the second charging method is selected, said control unit controls execution of the print process on the basis of the result of determination by said first determining unit.

9. The image processing system according to claim 1, wherein when the first charging method is selected, and said setting unit sets not to control execution of the print process by said printing unit on the basis of the result of determination by said first determining unit, said control unit causes said printing unit to execute the print process at a lower speed than in a case in which the second charging method is selected.

10. The image processing system according to claim 1, wherein the image processing system comprises an image forming apparatus including said printing unit and said control unit, and a charging apparatus including said charging unit, said managing unit, and said first determining unit, and said image forming apparatus and said charging apparatus transmit/receive information via an interface.

11. The image processing system according to claim 1, wherein one image forming apparatus includes said printing unit, said charging unit, said managing unit, said first determining unit, and said control unit.

12. An image forming apparatus connected to a charging apparatus for managing charging information, comprising:
a printing unit configured to print an image;
a determining unit configured to determine which one of a first charging method and a second charging method is selected by a user as a method of executing charging for a print process executed by said printing unit before executing the print process; and
a control unit configured to, when said printing unit is going to execute a print process of an image including a plurality of pages, inquire of said charging apparatus about whether execution of the print process is possible before said printing unit starts the print process when it is determined that the first charging method is selected, and cause said printing unit to execute the print process of the image including the plurality of pages without inquiry when it is determined that the second charging method is selected,
wherein the image forming apparatus further comprises a setting unit configured to set whether to control execution of the print process on the basis of the result of determination by said first determining unit,
wherein if said setting unit sets not to control execution of the print process on the basis of the result of determination by said first determining unit, and even if the first charging method is selected, said control unit causes said printing unit to execute the print process without determination by said first determining unit.

13. A control method of an image processing system, comprising the steps of:
executing a print process of an image;
executing, using one of a first charging method and a second charging method, a charging process for the executed print process;
selecting, before executing the print process, one of the first charging method and the second charging method according to a user operation;
managing balance information representing a balance usable for charging in the charging process;
determining, when executing a print process of an image including a plurality of pages, before a start of the print process of the image including the plurality of pages, on the basis of the managed balance information, whether execution of the print process of the image including the plurality of pages is possible; and
controlling execution of the print process on the basis of a result of determination by the determining step when the first charging method is selected, and executing the print process without determination by the determining step when the second charging method is selected,
wherein the method further comprises setting whether to control execution of the print process on the basis of the result of determination by said determining step,
wherein if said setting step sets not to control execution of the print process on the basis of the result of determination by said determining step, and even if the first charging method is selected, said controlling step causes said print step to execute the print process without determination by said determining step.

14. A control method of an image forming apparatus connected to a charging apparatus for managing charging information, comprising the steps of:
executing a print process of an image;
determining which one of a first charging method and a second charging method is selected by a user as a method of executing charging for the executed print process before executing the print process;

controlling to, when executing a print process of an image including a plurality of pages, inquire of the charging apparatus whether execution of the print process of the image including the plurality of pages is possible, before a start of the print process of the image including the plurality of pages, when it is determined that the first charging method is selected, and controlling to execute the print process of the image including the plurality of pages without inquiry when it is determined that the second charging method is selected, where the method further comprises setting whether to control execution of the print process on the basis of the result of determination by said determining step, wherein if said setting step sets not to control execution of the print process on the basis of the result of determination by said determining step, and even if the first charging method is selected, said controlling step causes said print step to execute the print process without determination by said first determining unit.

15. A non-transitory computer-readable storage medium storing a program for causing a computer to execute a control method of claim 13.

16. A non-transitory computer-readable storage medium storing a program for causing a computer to execute a control method of claim 14.

* * * * *